(12) United States Patent
Garland et al.

(10) Patent No.: US 6,553,641 B1
(45) Date of Patent: Apr. 29, 2003

(54) METHOD OF MANUFACTURING A RAZOR WITH MULTIPLE SHAVING AID ELEMENTS

(75) Inventors: Colman C. Garland, Orange; Andrew J. Curello, Hamden; Barry C. Johnson, III, Waterbury, all of CT (US)

(73) Assignee: BIC Corporation, Milford, CT (US)

( * ) Notice: Subject to any disclaimer, the term of this patent is extended or adjusted under 35 U.S.C. 154(b) by 0 days.

(21) Appl. No.: 09/488,086

(22) Filed: Jan. 20, 2000

Related U.S. Application Data

(63) Continuation-in-part of application No. 09/028,866, filed on Feb. 13, 1998, now Pat. No. 6,115,902.

(51) Int. Cl.[7] .......................... B23P 17/00; B26B 21/00
(52) U.S. Cl. ............................. 29/428; 30/41; 30/50; 156/73.2
(58) Field of Search ................ 29/417, 469.5, 29/DIG. 46, DIG. 47, 428; 30/41, 50; 156/73.2, 73.6

(56) References Cited

U.S. PATENT DOCUMENTS

| | | | |
|---|---|---|---|
| 3,477,127 A | 11/1969 | Regan | 30/41 |
| 3,517,442 A | 6/1970 | Regan | 30/41 |
| 4,170,821 A | 10/1979 | Booth | 30/41 |
| 4,473,944 A | 10/1984 | Carroll | 30/41 |
| 4,586,255 A | 5/1986 | Jacobson | 30/41 |
| 4,624,051 A | 11/1986 | Apprille, Jr. et al. | 30/50 |
| 4,778,640 A | 10/1988 | Braun et al. | 264/250 |
| 4,944,090 A | 7/1990 | Sumnall | 30/41 |
| 4,996,772 A | 3/1991 | Iten | 30/41 |
| 5,070,613 A | 12/1991 | Althaus et al. | 30/50 |
| 5,084,968 A | 2/1992 | Trotta | 30/47 |
| 5,301,425 A | 4/1994 | Ferraro | 30/42 |
| 5,347,714 A | 9/1994 | Prochaska | 30/41.5 |
| 5,369,885 A | 12/1994 | Ferraro | 30/41 |
| 5,524,347 A | 6/1996 | Prochaska | 30/50 |
| 5,526,567 A | 6/1996 | Carson, III et al. | 30/50 |
| 5,533,263 A | 7/1996 | Gilder | 30/87 |
| 5,546,660 A | 8/1996 | Burout et al. | 30/50 |
| 5,603,161 A | 2/1997 | Welsh | 30/41.7 |
| 5,711,076 A | 1/1998 | Yin et al. | 30/41 |
| 5,781,997 A * | 7/1998 | Ferraro et al. | |
| 5,822,862 A * | 10/1998 | Ferraro | |
| D401,014 S | 11/1998 | Tseng et al. | |
| 5,956,848 A | 9/1999 | Tseng et al. | 30/41 |
| 5,956,849 A * | 9/1999 | Chadwick et al. | |
| 6,233,829 B1 * | 5/2001 | Oglesby et al. | |

FOREIGN PATENT DOCUMENTS

| | | | |
|---|---|---|---|
| CA | 85238 | 11/1998 | |
| EP | 0 348 627 A1 | 1/1990 | 21/44 |

* cited by examiner

Primary Examiner—David P. Bryant
(74) Attorney, Agent, or Firm—Pennie & Edmonds LLP

(57) ABSTRACT

The present invention provides a razor with more than one shaving aid element placed in close proximity to one another on the cover of the razor. The provision of more than one shaving aid element in such manner provides a number of advantages such as: delivery of increased volume of shaving aid at the local area; simplification of manufacturing process during razor assembly; provision of different shaving aids in different shaving aid elements. A preferred shape of the shaving aid elements is cylindrical. The cylindrical shape also enhances the function of the razor by providing smoother shaving aid motion. The shaving aid element may be extruded and stored in spools for use in the razor assembly.

22 Claims, 6 Drawing Sheets

METHOD OF MANUFACTURING A RAZOR WITH MULTIPLE SHAVING AID ELEMENTS

CROSS-REFERENCE TO RELATED APPLICATION

The present application is a continuation-in-part of U.S. patent application Ser. No. 09/028,866, filed Feb. 13, 1998, now U.S. Pat. No. 6,115,902.

FIELD OF THE INVENTION

The present invention is directed to a razor having more than one shaving aid element.

BACKGROUND OF THE INVENTION

The incorporation of a shaving aid element in a disposable razor is often desirable. U.S. Pat. No. 4,170,821 ("'821 patent") discloses a razor cartridge with a solid water-soluble shaving aid. The shaving aid can be a lubricant, whisker softener, razor cleaner, medicinal agent, aloe vera, vitamin E, lanolin, and other ingredients or any combination of these. A typical composition of a shaving aid element comprises a hydrophilic polymer and other soluble shaving aids such as those listed above being embedded in a matrix of a hydrophobic polymer. Typically, polyethylene oxide is used as the hydrophilic polymer and polystyrene is used as the hydrophobic polymer. Other compositions are also possible.

The beneficial effect of shaving aids in a disposable razor can be enhanced by incorporating more than one shaving aid element into a razor. A number of prior art patents disclose razors or razor cartridges incorporating two shaving aid elements. However, the disclosed shaving aid elements are positioned on the razor spaced apart from one another on different razor elements. For example, U.S. Pat. No. 5,524,347 discloses a razor cartridge with a first shaving aid element located on the upper surface of a cap member, behind the shaving blades, and a second shaving aid element positioned near the guard member of the razor, forward of the shaving blades. In U.S. Pat. No. 5,369,885, the shaving aid elements are attached respectively to the cap portion behind the shaving blades and to the seat portion forward of the shaving blades.

The beneficial effect of shaving aids in a disposable razor can be enhanced by incorporating more than one shaving aid element into a razor. A number of prior art patents disclose razors or razor cartridges incorporating two shaving aid elements. However, the disclosed shaving aid elements are positioned on the razor spaced apart from one another. For example, U.S. Pat. No. 5,524,347 discloses a razor cartridge with a first shaving aid element located on the upper surface of a cap member, behind the shaving blades, and a second shaving aid element positioned near the guard member of the razor, forward of the shaving blades. In U.S. Pat. No. 5,369,885, the shaving aid elements are attached respectively to the cap portion behind the shaving blades and to the seat portion forward of the shaving blades.

The separation of the shaving aid elements in these patents does not readily permit the benefits of one shaving aid element to be provided in conjunction with the benefits of the other shaving aid element. Thus, there exists a need for a feasible method of manufacturing shaving aid elements and securely coupling such elements to a razor in close proximity to one another.

Regardless of the exact chemical composition used for the shaving aid element, injection molding or extrusion can be used to manufacture shaving aid elements in quantities necessary for mass production. In injection molding, the shaving aid element is co-molded directly in the razor as shown in U.S. Pat. No. 4,778,640. In extrusion, the shaving aid element is extruded in the desired shape and then typically cut to size and secured to the razor as shown in U.S. Pat. No. 4,624,051 ("'051 patent").

U.S. Pat. No. 5,956,848 ("'848 patent"), discloses an extruded shaving aid element that has a composite structure. The shaving aid element of the '848 patent consists of two shaving aid elements that are co-extruded. When secured to a razor cartridge, the composite shaving aid element presents two adjacent exposed lengthwise-extending portions. However, manufacturing such co-extruded structure can pose difficulties during assembly because in many situations, the two co-extruded elements may shrink at different rates during drying or curing and result in bending of the shaving aid element. To overcome this problem, the compositions of the two shaving aid elements may have to be modified with additives which may compromise the effectiveness of the shaving aids.

Another disadvantageous aspect of the composite shaving aid element of the '848 patent is its non-symmetric cross-sectional shape. The composite co-extruded shaving aid element of the '848 patent has a three-lobed Y-shaped first element with a second element co-extruded into the upper trough of the Y-shape. Such non-symmetrical shape complicates manufacture and limits the viable storage methods for the stock of shaving aid element before it is used in the razor manufacturing process.

Methods for securing the precut shaving aid element to the razor include mechanical means and adhesives. When mechanical means is utilized, the razor is made with an internal cavity and the shaving aid element is inserted into the cavity as illustrated in the '051 patent. A tab or any like member retains the shaving aid element in the cavity. The '848 patent also illustrates a shaving aid element that is mechanically locked into a razor cartridge. In the '848 patent, the shaving aid element has a ridge running along the bottom side of the shaving aid element which locks into a mating receiving portion of the cartridge. Disadvantages associated with such mechanical method include the need to precisely precut the shaving aid element to close tolerances and to form the shaving aid element from a material with suitable hardness and resiliency for such mechanical connection, as well as the added manufacturing expense and time of producing the tabs or like members. Furthermore, positioning the precut elements in the proper orientation and position for affixing to the razor complicates the manufacturing process.

When an adhesive, such as acrylate adhesive, is used, the shaving aid element and the razor must be properly positioned after the adhesive is applied and clamped together for a period of time to allow a bond to form. Although the curing time can be reduced by the application of energy, such as ultraviolet radiation, this adds another manufacturing step and increases production costs. Furthermore, the ultraviolet radiation may be absorbed or deflected by structural elements on the razor units, thereby preventing uniform curing of the adhesive. In any event, even accelerated cure time decreases manufacturing efficiency. Other disadvantages with adhesives are the added expense of the adhesive and the difficulties associated with the handling of adhesives.

The application of ultrasonic energy to join plastic components has been utilized in many industries. In ultrasonic welding, a solid-state power supply transforms electrical energy to 20 kHz or 40 kHz mechanical energy. A converter changes this electrical energy into ultrasonic mechanical vibratory energy. A horn transmits the ultrasonic mechanical energy directly to the parts to be assembled. A combination of applied force, surface friction, and intermolecular friction at the mating surface between the parts to be joined elevates the temperature until the melting point of the material is reached. Force is maintained after the vibrations cease and a molecular bond or weld at the interface is produced. A more complete discussion of ultrasonic welding is found in the following publications, which are hereby incorporated by reference: "Ultrasonics & Microprocessors Team-up for Efficient Assembly," *Assembly Engineering*, November 1987, and *Ultrasonics Plastics Assembly*, 1979, published by the Branson Ultrasonics Corporation.

Ultrasonic welding has also been used in the shaving industry. For example, U.S. Pat. No. 5,070,613 describes a razor blade unit with a blade holder secured by a fixation strip ultrasonically welded to a lower portion of the razor blade unit. Further, it is well known to ultrasonically weld a head portion of a disposable razor to a handle portion. However, ultrasonic welding of a shaving aid element has not been suggested or disclosed in the art.

SUMMARY OF THE INVENTION

The present invention provides a method of manufacturing a razor imparting various benefits such as the provision of more than one shaving aid element as well as a simplified manufacturing process for attaching the shaving aid elements to the razor. Each shaving aid element may carry a different shaving aid, such that the user is provided with more than one shaving aid.

In accordance with the principles of the present invention, the multiple shaving aid elements are provided in close proximity to one another on a same razor component where the razor component may be a cover, a guard, a blade seat, a blade protector (an element which is selectively positioned over the blade to cover the blade cutting edge), or a handle of the razor. In one embodiment, exemplified in FIG. 1, the shaving aid elements are provided on the cover of the razor, behind the razor blade and spaced apart from each other. Preferably, the shaving aid elements are formed separately from each other. The shaving aid elements may be seated in channels on the surface of the cover. The placement of the shaving aid elements on the same razor component rather than on different razor components processed at different stations simplifies the manufacturing process because placement of the shaving aid elements is then performed at the same assembly station, e.g., only at the cover assembly station.

A number of additional advantages are also provided by the formation of shaving aid elements with a cylindrical cross-section, as in one embodiment of the invention. The rounded surface of cylindrical shaving aid elements allows the shaving aid elements to contact the skin surface at a tangent. This allows the skin and the shaving aid elements to glide easily with respect to each other, resulting in a smooth shaving motion. The cylindrical shape is also optimal for manufacturing because it requires the least amount of adhesion to secure the shaving aid elements in the channels. The seating of the shaving aid elements in channels such that the shaving aid elements protrude minimally from the surface of the cover further enhances the above benefits of a cylindrical shaving element while providing a firm securement of the shaving aid elements with respect to the razor. The protrusion from the razor component of a rounded shaving aid element surface rather than a surface with sharper comers, such as present on the flat shaving aid elements of the prior art, presents a surface less susceptible to dragging forces. As such, lower forces are imparted to the rounded shaving aid element during shaving than are imparted to a shaving aid element with sharper comers, and thus less adhesion is required to secure the rounded shaving aid element in place.

Preferably, if a cylindrical shaving aid element is provided, at least two shaving aid elements should be provided because a cylindrical element imbedded in a channel exposes less surface area than a typical flat shaving aid element. Utilization of more than one shaving aid elements in the present invention compensates for that factor and permits a greater amount of shaving aid to be released during shaving.

DESCRIPTION OF THE PREFERRED EMBODIMENTS

Figure 1:
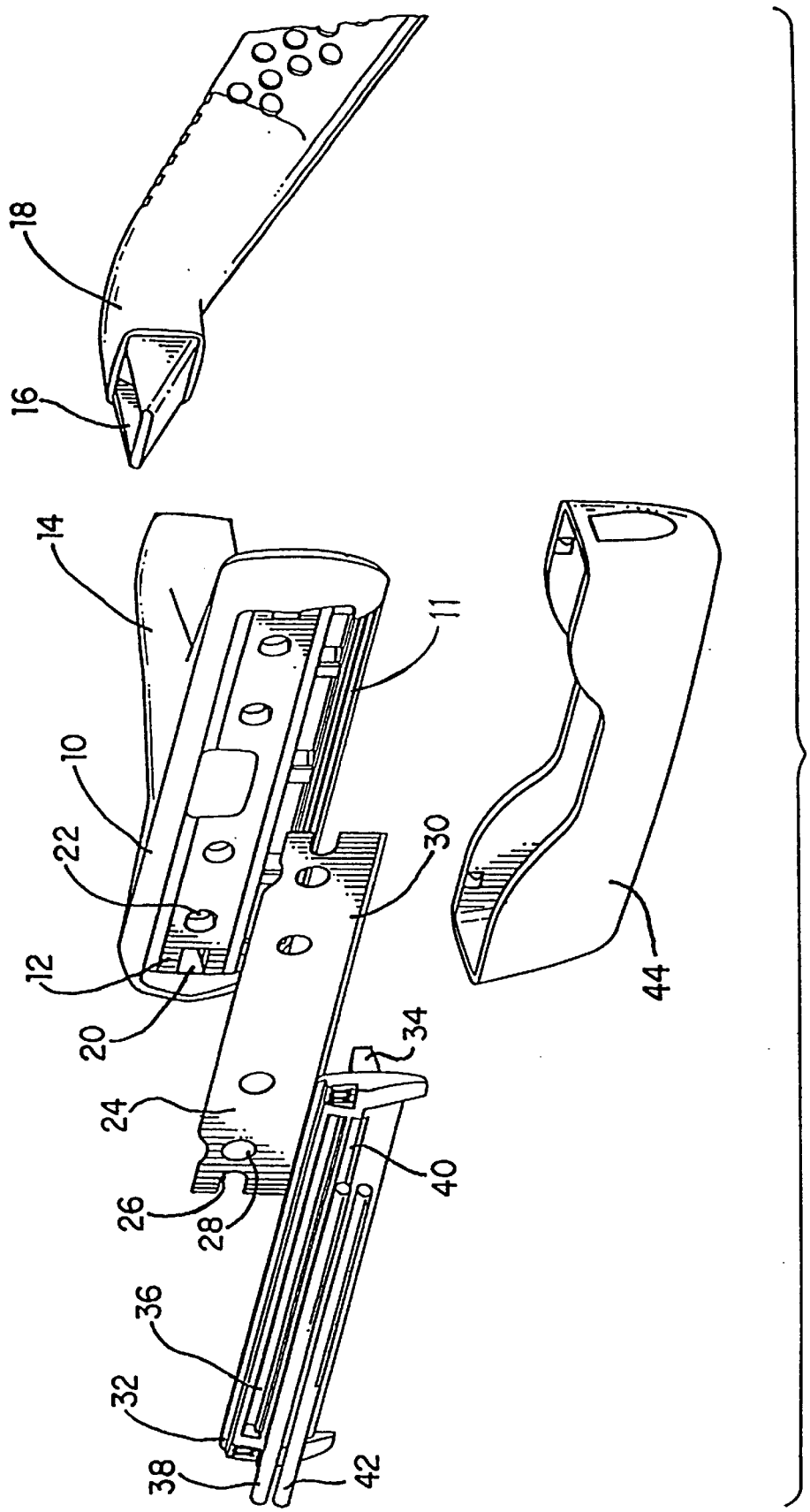
FIG. 1 is an exploded perspective view illustrating a razor with shaving aid elements manufactured according to the present invention.

As shown in FIG. 1, a razor comprises a blade seat 10 with a seating portion 12 and a connecting portion 14. Connecting portion 14 mates with an arm 16 of handle 18, only a portion of which is depicted. Connecting portion 14 and arm 16 are permanently attached to each other using any appropriate method, such as an adhesive or by ultrasonic welding. Thus, the razor shown in FIG. 1 is a disposable razor in which the entire unit is discarded when the blade becomes dulled. The present invention can also be utilized to manufacture a disposable cartridge adapted for coupling to and uncoupling from a reusable razor handle, and thus, the present invention is not limited to any particular type of razor configurations.

Seating portion 12 includes a rectangular opening 20 on each end and a plurality of circular holes 22 disposed therebetween. The seating portion 12 is configured and dimensioned to receive at least one blade 24. Blade 24 has end slots 26 and a plurality of circular holes 28 disposed therebetween. When blade 24 is properly seated in seating portion 12, slots 26 align with openings 20 and holes 22 align with holes 28. Although the razor is shown having only one blade, the method of manufacturing according to the present invention can also be used on disposable razors or cartridges having multiple blades. With the exception of a cutting edge 30 of blade 24, a cover 32 covers all of blade 24. Rivets 33 (shown in FIG. 5) and posts 34 extend from a back side of cover 32. Blade 24 is held by rivets 33 which are inserted into holes 22 on seating portion 12 through holes 28 on blade 24, and by posts 34 which are inserted into rectangular openings 20 through end slots 26. Ends 35 of rivets 33 are compressed to permanently attach cover 32 and blade 24 to blade seat 10. After the razor has been assembled, blade protector 44 covers cutting edge 30 and protects it until use and between uses.

In accordance with the principles of the present invention, more than one shaving aid element is provided on a razor, the shaving aid elements being in close proximity to one another. In the exemplary razor of FIG. 1, first and second shaving aid elements 38, 42 are provided on the cover 32 of the razor behind cutting edge 30 of blade 24. As shown in FIG. 1, cover 32 has an upper channel 36 adapted to receive first shaving aid element 38 and a lower channel 40 for receiving second shaving aid element 42. However, the plurality of shaving aid elements may be provided on another razor component, such as the guard 11, the blade seat 12, the blade protector 44, or the handle 18, receipt within a channel in such razor component being optional but not necessary. Thus, more than one shaving aid element is preferably provided on a same razor component, the shaving aid elements preferably being in close proximity to one another.

The shaving aid elements can include shaving aids such as lubricants, whisker softeners, razor cleaners, medicinal agents, aloe vera, vitamin E, lanolin, or any combination of these. Each of the shaving aid elements may carry a different shaving aid, thus, two shaving aids which may not perform optimally when provided in the same shaving aid element may nonetheless be provided on the same razor. If different shaving aids are provided in different shaving aid elements, then the shaving aid elements may be placed at different locations preferably selected based on the optimal location for delivery of the shaving aid carried by the shaving aid element. Thus, one or more shaving aid elements carrying a first shaving aid may be placed at a first location optimal for delivery of such first shaving aid and one or more shaving aid elements carrying a second shaving aid may be placed at a second location optimal for delivery of such second shaving aid, etc.

The multiple shaving aid elements in the present invention, particularly when provided on the cover 32 or guard 11 of the razor, are preferably aligned parallel to the blade cutting edge 30 and also parallel to each other rather than being positioned coaxially to each other, as illustrated in FIG. 1. Thus, each shaving aid element preferably is positioned progressively further from the blade cutting edge, the shaving aid elements being parallel to but in proximity with one another. When compared to other arrangements providing multiple shaving aid element contact surfaces, such as the three coaxially aligned rectangular surfaces provided in U.S. Pat. No. 4,624,051, the parallel, non-colinear arrangement delivers more shaving aid to the user's skin because a greater shaving aid element surface area sweeps across the skin.

In another embodiment, the shaving aid elements may be placed on the cover 32 perpendicular to the blade cutting edge 30 but parallel to and spaced apart from each other, i.e., not coaxial with each other.

Additionally, when both shaving elements carry the same shaving aid, a greater volume of shaving aid at a given location because the shaving aid elements are placed in close proximity to one another on the razor, resulting in a greater shaving aid element surface area at such location. It is also important to note that the present invention can be practiced with any number of shaving aid elements.

The shaving aid elements may be formed by any desired method of manufacture. In one embodiment, a shaving aid element is extruded into a continuous strand in a wellknown manner and is air-cooled prior to being rolled onto a spool for storage. Methods for extruding shaving aid have been disclosed in the '821 patent and references cited therein, and are hereby incorporated by reference herein. U.S. Pat. No. 4,182,582 also teaches a method of co-extruding different polymers including hydrophilic and hydrophobic materials and is hereby incorporated by reference herein. The '051 patent also discloses that the hydrophobic polymer matrix can make up to 50% or more by volume of the shaving aid element. The hydrophobic polymer can make up from 20% to 80% by volume of the shaving aid element. It is preferred that the matrix makes up about 25%–35% by volume of the shaving aid element and the matrix material is polystyrene. The remaining volume of the shaving aid comprises the various water soluble shaving aid materials. It is also preferred that the environmental factors, such as temperature and humidity, be controlled during the extrusion process to minimize the absorption of water by the hydrophilic polymers contained in the shaving aid.

Furthermore, a preferred shape for the extruded shaving aid strand is cylindrical with a circular cross-section, such shape providing a number of advantages. The cylindrical shape is the optimal shape for rolling onto a spool for storage. In addition, cylindrical shaving aid elements contact the skin surface at a tangent, thus allowing the skin and the shaving aid elements to glide easily with respect to each other to result in a smooth shaving motion. The preferred cylindrical shape of the shaving aid elements requires the least amount of adhesion to hold them in place, such as in the channels 36, 40, as compared to the possible cross-sectional shapes.

Figure 2:
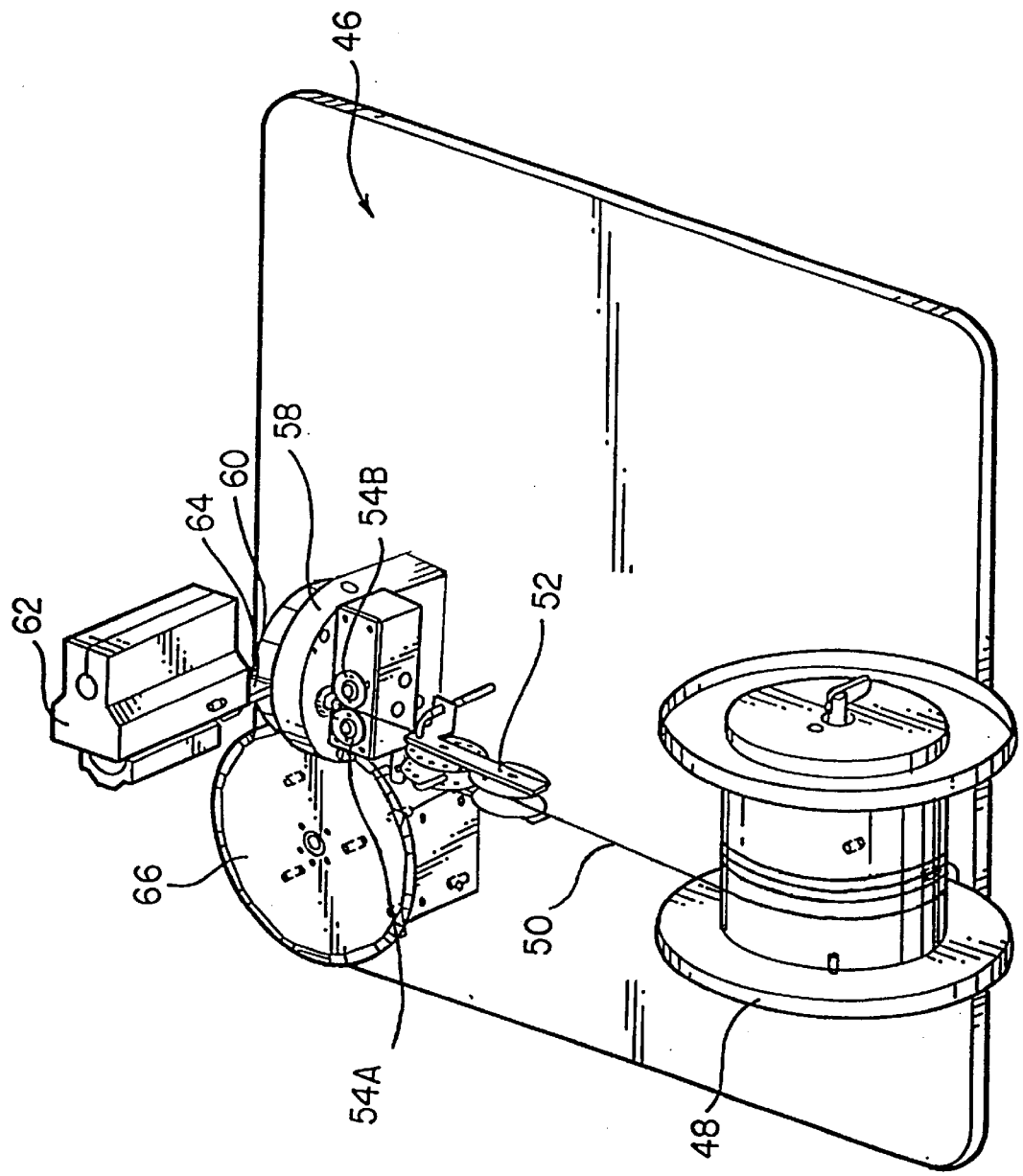
FIG. 2 is a schematic of a manufacturing assembly using the method according to the present invention to produce the razor.

It will be appreciated that the shaving aid elements may be coupled to the razor in any desired manner. One manner in which the shaving aid elements may be attached to the razor in accordance with the present invention is shown in FIG. 2. A manufacturing assembly 46 employs a spool 48 which contains a shaving aid element in the form of a continuous strand 50 as discussed above. Strand 50 is fed from spool 48 through tensioning elements 52 which draw strand 50 taut into left roller 54A and right roller 54B to be cut into the predetermined length and be affixed onto the razor.

Thus in accordance with the present invention, cutting the shaving aid element into pre-measured segments for storage and then orienting and positioning the shaving aid elements prior to affixing them to the razor as illustrated in the '051 patent have been eliminated.

Figure 3:
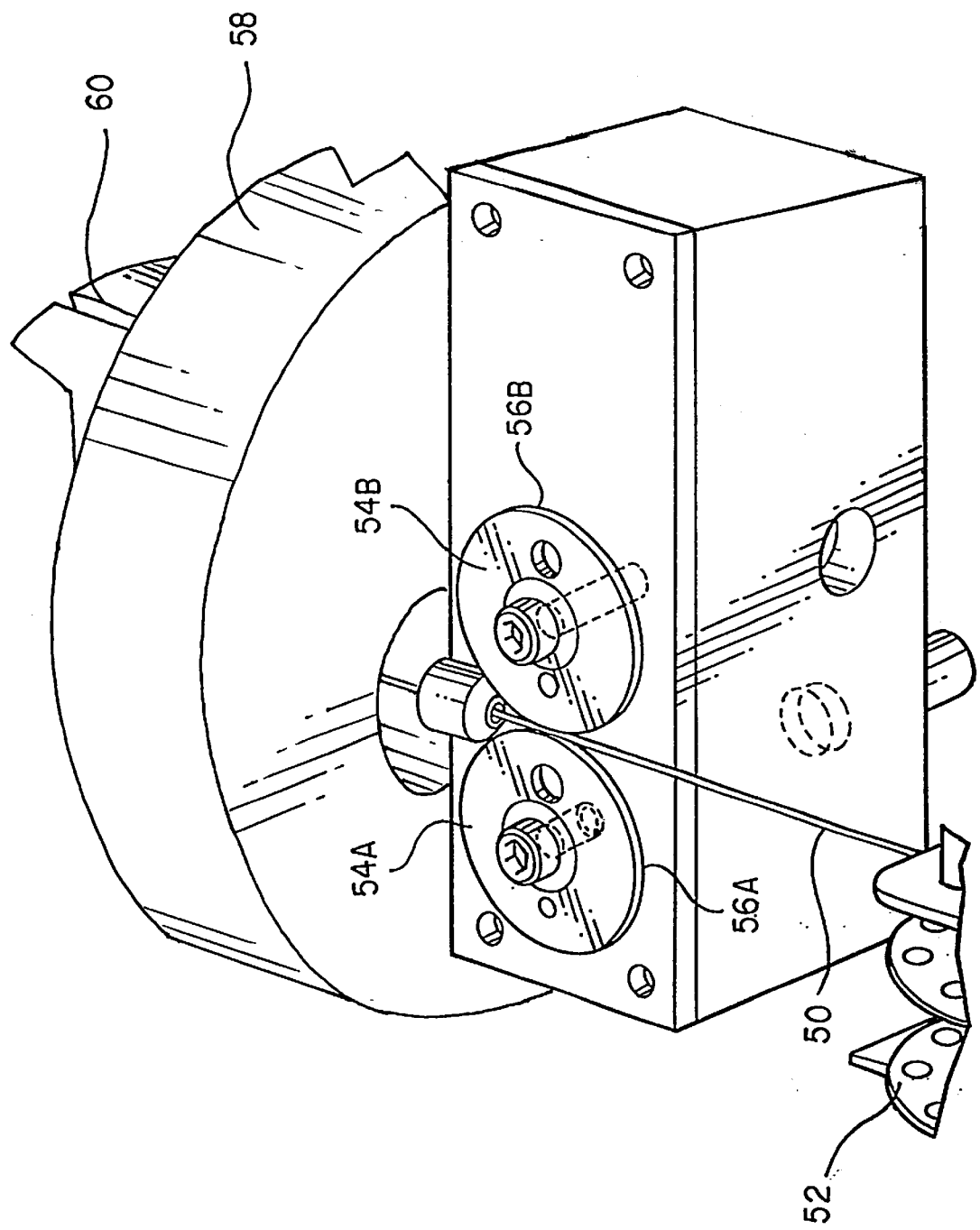
FIG. 3 is an enlarged schematic of a cold working portion of the manufacturing assembly.

Rollers 54A, 54B are adapted to pull strand 50 from spool 48 and feed the shaving aid element from strand 50 to the razor assembly unit. Rollers 54A and 54B may also cold work strand 50 into any desired profile of the shaving aid elements that can be co-rolled including symmetrical cross-sections such as circular, square, rectangular, triangular, and elliptical, and non symmetrical cross-sections. As best seen in FIG. 3, left and right rollers 54A, 54B have contacting surfaces 56A, 56B, respectively. The degree of cold working and the final profile of the shaving aid elements depend on the geometry and dimension of contacting surfaces 56A, 56B. It is not necessary for contacting surfaces 56A, 56B to be identical. For example, contacting surface 56A can be rectangular and contacting surface 56B can be rounded. It has been observed that cold working also provides strand 50 with increased ductility. The increased ductility of strand 50 provides greater flexibility in the manufacturing process. Alternatively, heat may be added to rollers 54A and 54B to facilitate the process.

Referring to FIGS. 2 and 3, strand 50 is fed into wheel 58 after the optional cold working step. Wheel 58 has a plurality of fixtures 60. Each fixture 60 is configured and dimensioned to receive one cover 32 and any method of feeding cover 32 into fixture 60 can be used. For example, the covers 32 may be fed into fixtures 60 on wheel 58 by a vibrating bowl, such vibrating bowls are available from Moorseed Corp. in Indianapolis, Ind., USA. When a portion of strand 50 has been fed into and aligned with fixture 60, a predetermined length of strand 50 is cut and the shaving aid element is affixed to cover 32 at either upper or lower channel 36, 40.

An ultrasonic welder/cutter 62 cuts strand 50 into a predetermined length of shaving aid element and ultrasonically welds the shaving aid element to the razor. Ultrasonic welder/cutter 62 includes an actuator, which contains a converter, booster, horn, and pneumatic or servo controls. The actuator brings the horn 64 into contact with fixture 60, applies appropriate force during the welding and cutting, and retracts the horn after the weld cycle. After the shaving aid element has been ultrasonically welded to cover 32, cover 32 may be transferred to a quality control unit 66 for inspection.

For the sake of simplicity, FIG. 2 and FIG. 3 show the attachment of only one shaving aid element to the cover 32. In order to attach a second shaving aid element, a second configuration of a spool, tensioning elements, and rollers would feed a second strand into wheel 58. A second ultrasonic welder/cutter is utilized to cut and weld the second shaving aid element to the cover 32. The placement of all shaving aid elements on the same razor component, such as the cover in the example described herein, simplifies the manufacturing process since the cutting, placing and welding of the shaving aid elements onto that component can be performed in one assembly station. It will be appreciated that multiple shaving aid elements may be positioned on another single razor component. Preferably, the shaving aid elements are formed as separate elements in contrast with the shaving aid elements of the previously disclosed '051 patent in which the shaving aid element has a plurality of body portions extending from the same support element.

Figure 4:
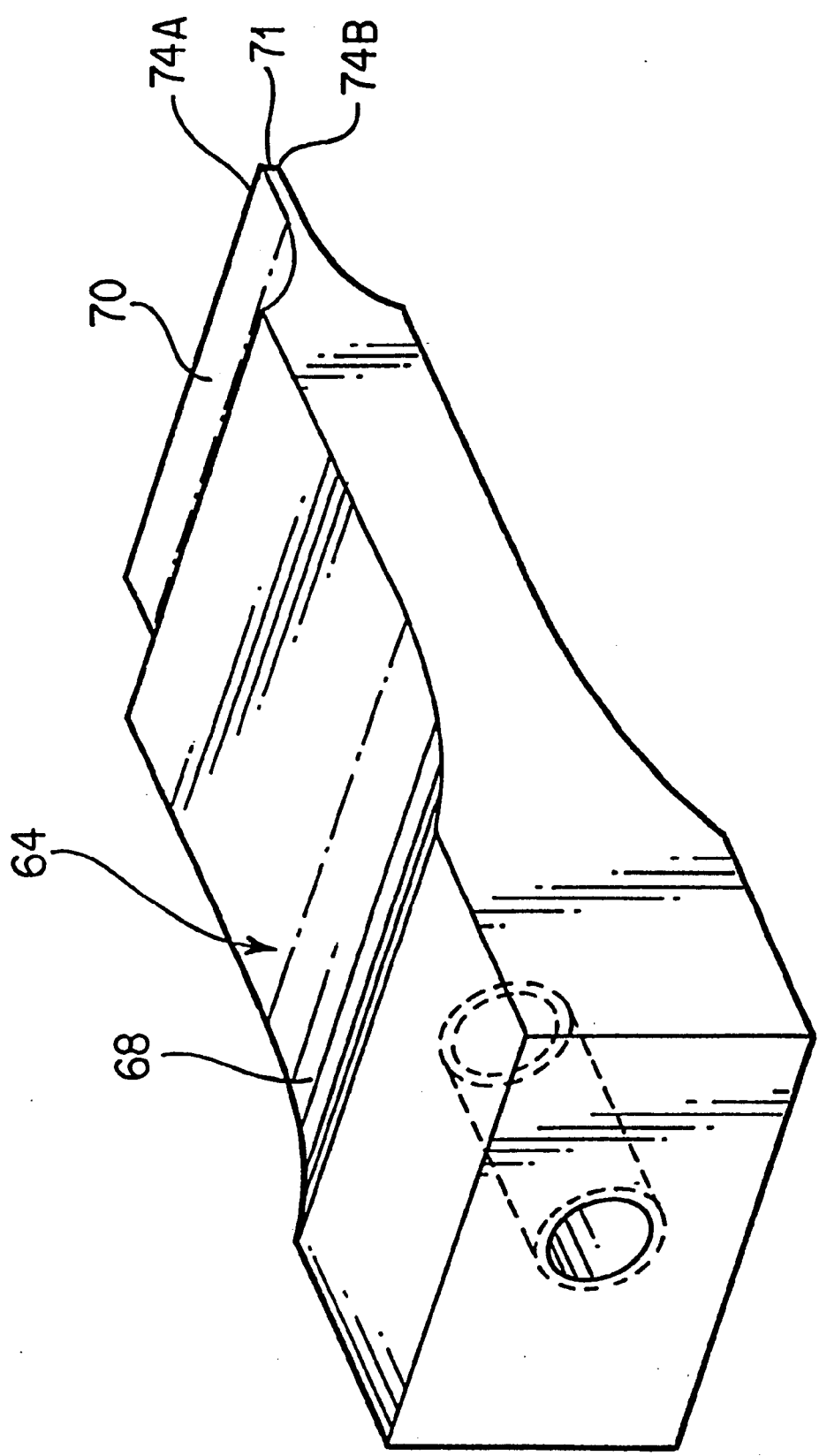
FIG. 4 is an isometric view of a horn of an ultrasonic welder/cutter.
Figure 5:
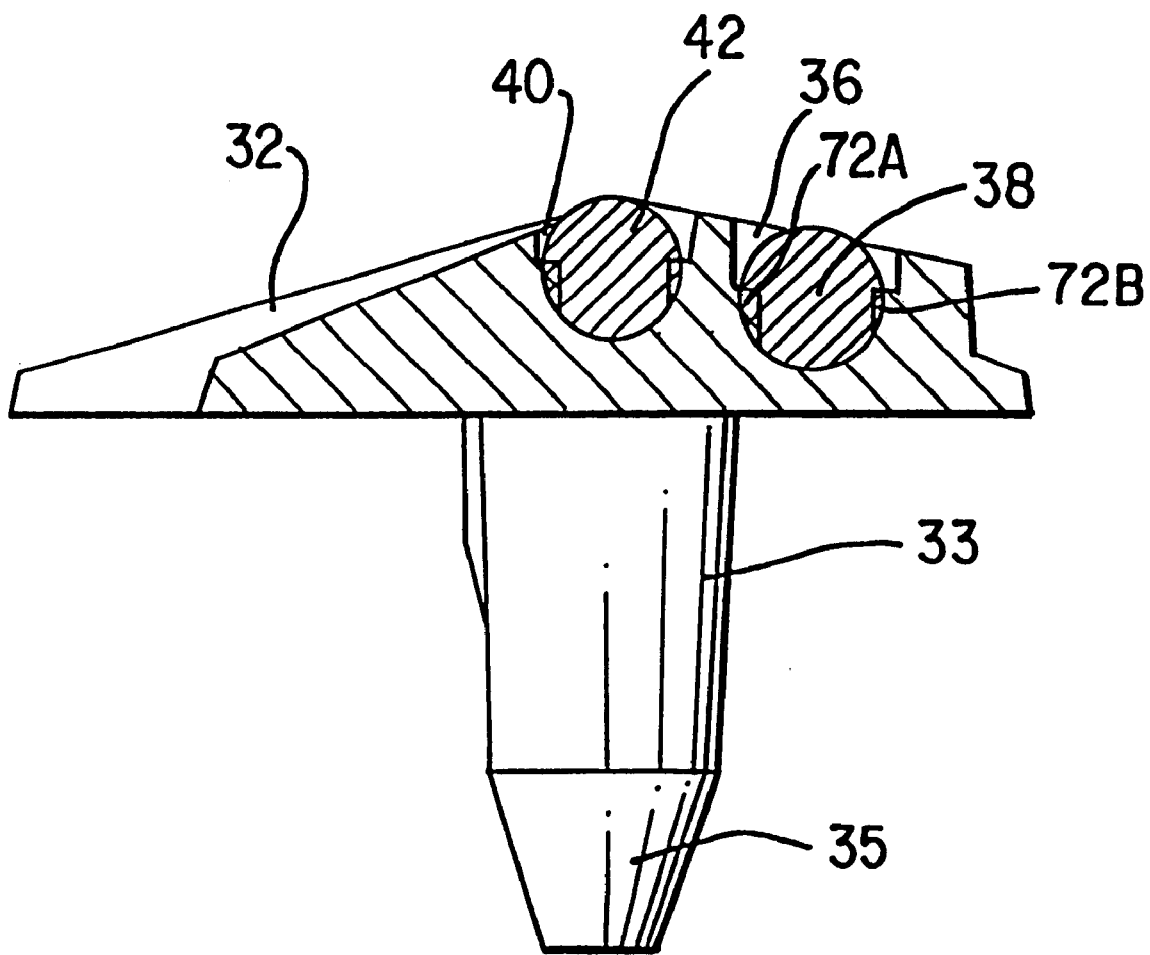
FIG. 5 is a cross sectional view of a razor cover having the shaving aid elements.
Figure 6:
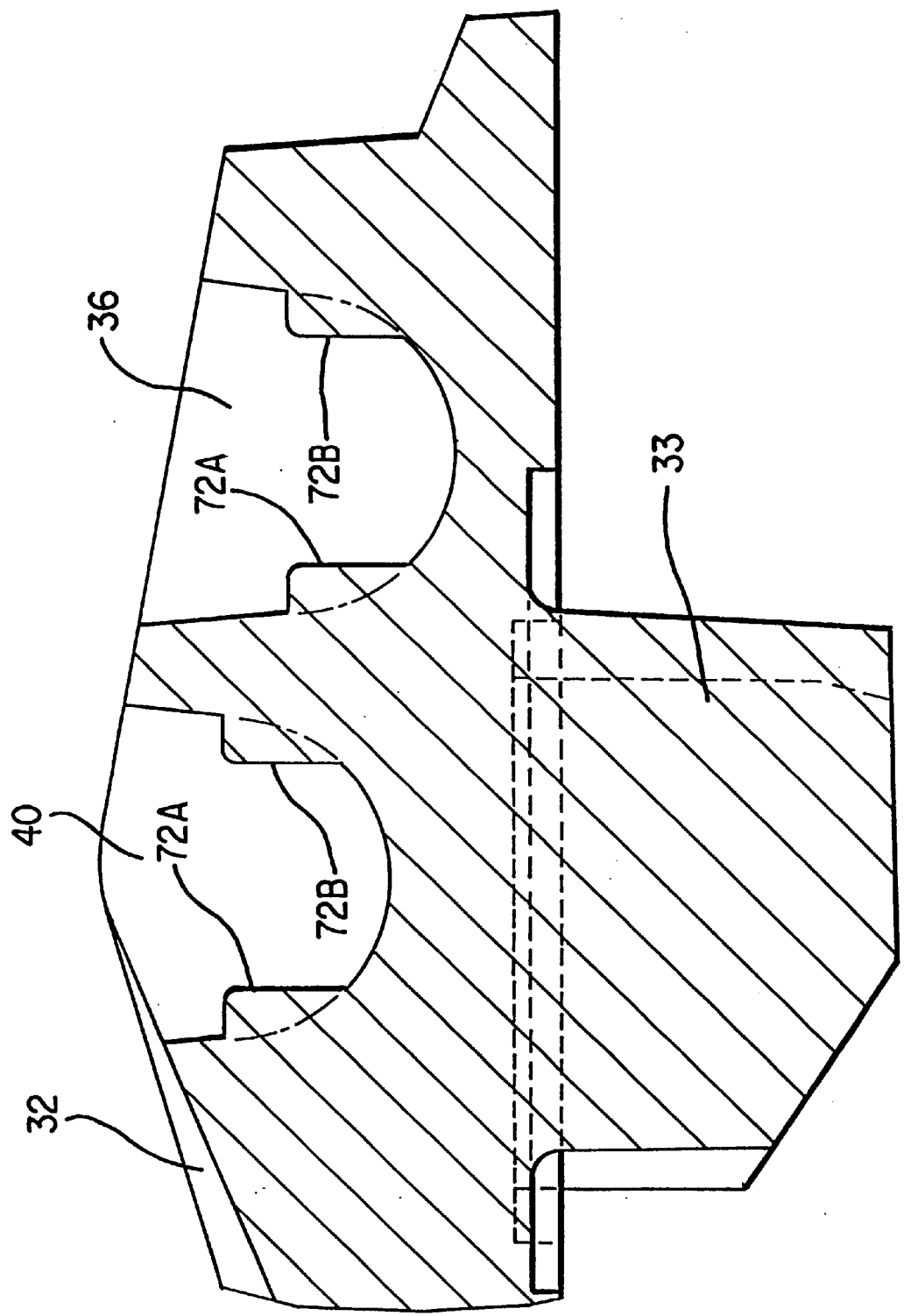
FIG. 6 is a cross sectional view of the razor cover shown in FIG. 4 without the shaving aid elements.

In another preferred embodiment of the invention, the ultrasonic energy emanating from horn 64 is directed away from the bottom of channels 36, 40 and toward the side walls of these channels. As shown in FIG. 4, horn 64 has a tapered body 68 which terminates at an energy transmitter 70. The geometry of horn 64 controls the direction of the ultrasonic energy preferably toward side walls 72A and 72B (FIGS. 5 and 6) of channels 36, 40. More specifically, energy transmitter 70 comprises a circular portion 71 configured and dimensioned to fit over shaving aid elements 38, 42. Circular portion 71 terminates at corners 74A and 74B. The ultrasonic energy emanating from transmitter 70 preferably partially melts a portion of side walls 72A and 72B shown in FIG. 6 to form a weld between the shaving aid elements and the side walls. As shown in FIG. 5, the shaving aid elements are shown in an overlapping manner with side walls 72A and 72B. After the ultrasonic energy is applied, the overlapping areas melt together to form two continuous weld lines between each shaving aid element and channel 36, 40 to permanently attach the shaving aid elements to the razor cover.

It is known that a strong ultrasonic weld can be produced if the parts to be joined are made of the same or similar materials. Therefore, if polystyrene is used as the hydrophobic component of shaving aid elements 38, 42, it is preferred that cover 32 also be made of polystyrene. However, the method according to the present invention can produce a bond of sufficient strength between dissimilar materials. Thus, a sufficient bond can be established between the shaving aid elements 38, 42 and the cover 32, even when these elements are made out of dissimilar materials.

The shaving aid elements are positioned on the cover such that at least one of the shaving aid elements is in-line with and not offset from the row of rivets 33 extending from the back side of cover 32. This alignment minimizes deformation of the shaving aid elements during the rivet compression process by which the cover 32 and blade 24 are attached to the blade seat.

While it is apparent that the illustrative embodiments herein disclose various combinations of various principles of the present invention, it will be appreciated that numerous modifications and other embodiments may be devised by those skilled in the art. Moreover, not all principles disclosed herein must be applied in order to form a razor in accordance with the general principles of the present invention. Therefore, it will be understood that the appended claims are intended to cover all such modifications and embodiments and separately patentable inventive features which come within the spirit and cope of the present invention.

What is claimed is:

1. A razor or cartridge formed from a plurality of razor components comprising:
   at least one razor blade; and
   more than one shaving aid element in close proximity to one another and non-coaxially positioned on a same razor component without another razor component therebetween, at least one of said shaving aid elements being formed separate from the other of said shaving aid elements.

2. The razor or cartridge of claim 1, wherein said razor components include a cover, a guard, a handle, a blade protector, and a blade seat.

3. The razor or cartridge of claim 1, wherein a channel is formed in said razor component for each of said more than one shaving aid element, each shaving aid element being secured to said razor component in a respective channel.

4. The razor or cartridge of claim 1, wherein said blade has a cutting edge and said shaving aid elements extend along the razor component parallel to said cutting edge.

5. The razor or cartridge of any one of claims 1, wherein at least one of said shaving aid elements carries a shaving aid selected from the group consisting of: a lubricant, a whisker softener, a razor cleanser, a medicinal agent, aloe vera, vitamin E, and lanolin.

6. The razor or cartridge of claim 1, wherein:
   at least two of said shaving aid elements carry a shaving aid selected from the group consisting of: a lubricant, a whisker softener, a razor cleanser, a medicinal agent, aloe vera, vitamin E, and lanolin; and
   said shaving aid elements include two shaving aid elements carrying different shaving aids.

7. The razor or cartridge of claim 1, wherein said shaving aid elements have circular cross-sections.

8. The razor or cartridge of claim 1, wherein said shaving aid elements have substantially the same dimensions.

9. The razor or cartridge according to claim 1, wherein said shaving aid elements are substantially the same length as the cutting edge of the at least one razor blade.

10. A razor or cartridge according to claim 1, wherein said shaving aid elements are formed from extruded strands of shaving aid element having a circular cross-section.

11. A razor or cartridge formed from a plurality of razor components including at least one razor blade having a cutting edge, all cutting edges of said razor or cartridge facing in the same direction, said razor or cartridge further comprising:

more than one shaving aid element parallel to and spaced apart and formed separately from each other such that said shaving aid elements are progressively further away, in the same direction away from said cutting edge of said blade, from said cutting edge of said blade.

12. A method of forming a razor or cartridge having at least one blade, and being formed from a plurality of razor components, said method comprising:

providing more than one shaving aid element in close proximity to one another and non-coaxially positioned on a same razor component without another razor component therebetween, at least one of said shaving aid elements being formed separately from the other of said shaving aid elements.

13. The method of claim 12, further comprising the step of welding said shaving aid elements to said razor component.

14. The method of claim 13, further comprising the step of positioning said shaving aid elements parallel to a cutting edge of said blade.

15. The method of claim 12, further comprising the step of providing at least one of said shaving aid elements with a shaving aid selected from the group consisting of: a lubricant, a whisker softener, a razor cleanser, a medicinal agent, aloe vera, vitamin E, and lanolin.

16. The method of claim 12, further comprising the step of providing at least two of said shaving aid elements with a shaving aid selected from the group consisting of: a lubricant, a whisker softener, a razor cleanser, a medicinal agent, aloe vera, vitamin E, and lanolin; wherein two of said shaving aid elements carry different shaving aids.

17. The method of claim 12, further comprising the step of attaching said shaving aid elements in respective channels in said razor component.

18. A razor or cartridge formed from a plurality of razor components comprising:

at least one razor blade; and more than one shaving aid element non-coaxially positioned on a same razor component on one side of a cutting edge of said at least one razor blade, at least one of said shaving aid elements being formed separate from the other of said shaving aid elements.

19. A razor or cartridge according to claim 18, wherein said shaving aid elements are parallel to and spaced apart from each other and not positioned coaxially to each other.

20. A razor or cartridge formed from a plurality of razor components comprising:

at least one razor blade; and more than one shaving aid element formed from extruded strands of shaving aid having a circular cross-section.

21. A method of forming a razor or cartridge having a plurality of razor components and at least one blade, said method comprising:

providing more than one shaving aid element non-coaxially positioned on a same razor component on one side of a cutting edge of said at least one blade, wherein at least one of said more than one shaving aid element is formed separately from the other.

22. The razor or cartridge of claim 4, wherein each said shaving aid element extends along substantially the full lengt of said blade cutting edge.

* * * * *